United States Patent
Matsumoto et al.

(10) Patent No.: US 10,951,144 B2
(45) Date of Patent: Mar. 16, 2021

(54) THYRISTOR STARTER

(71) Applicant: TOSHIBA MITSUBISHI-ELECTRIC INDUSTRIAL SYSTEMS CORPORATION, Chuo-ku (JP)

(72) Inventors: Yasuaki Matsumoto, Chuo-ku (JP); Hiroshi Ogino, Chuo-ku (JP); Hironori Kawaguchi, Chuo-ku (JP); Akinobu Ando, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/611,155

(22) PCT Filed: Jun. 21, 2017

(86) PCT No.: PCT/JP2017/022843
§ 371 (c)(1),
(2) Date: Nov. 5, 2019

(87) PCT Pub. No.: WO2018/235188
PCT Pub. Date: Dec. 27, 2018

(65) Prior Publication Data
US 2020/0076339 A1 Mar. 5, 2020

(51) Int. Cl.
*H02P 9/08* (2006.01)
*H02P 1/52* (2006.01)
(Continued)

(52) U.S. Cl.
CPC .............. *H02P 9/08* (2013.01); *H02P 1/52* (2013.01); *H02P 9/30* (2013.01); *H02P 27/047* (2013.01);
(Continued)

(58) Field of Classification Search
CPC ...... H02P 9/08; H02P 9/30; H02P 1/52; H02P 27/047; H02P 27/06
See application file for complete search history.

(56) References Cited

U.S. PATENT DOCUMENTS

| 4,682,094 A | 7/1987 | Kuroiwa |
| 2015/0137722 A1* | 5/2015 | Ogino .................... G01R 21/00 318/400.26 |

(Continued)

FOREIGN PATENT DOCUMENTS

| DE | 10 2007 021 723 A1 | 11/2008 |
| EP | 2 031 733 A2 | 3/2009 |
| WO | WO 2014/033849 A1 | 3/2014 |

OTHER PUBLICATIONS

International Search Report dated Sep. 12, 2017 in PCT/JP2017/022843 filed on Jun. 21, 2017.
(Continued)

*Primary Examiner* — Sean Gugger
(74) *Attorney, Agent, or Firm* — Oblon, McClelland, Maier & Neustadt, L.L.P.

(57) ABSTRACT

A thyristor starter is configured to accelerate a synchronous machine from a stop state to a predetermined rotation speed by sequentially performing a first mode of performing commutation of an inverter by intermittently setting DC output current of a converter to zero and a second mode of performing commutation of the inverter by induced voltage of the synchronous machine. In a first case in which a first synchronous machine having a first inductance is started, a switching rotation speed for switching from the first mode to the second mode is set to a higher rotation speed, compared with a second case in which a second synchronous machine having a second inductance larger than the first inductance is started.

6 Claims, 9 Drawing Sheets

(51) Int. Cl.
     *H02P 9/30*           (2006.01)
     *H02P 27/04*         (2016.01)
     *H02P 27/06*         (2006.01)

(52) U.S. Cl.
     CPC .......... *H02P 27/06* (2013.01); *H02P 2201/13* (2013.01); *H02P 2209/11* (2013.01)

(56) References Cited

U.S. PATENT DOCUMENTS

2015/0236622 A1     8/2015   Ogino et al.
2020/0177111 A1*   6/2020   Matsumoto ............... H02P 6/20

OTHER PUBLICATIONS

Extended European Search Report dated Dec. 3, 2020, in Patent Application No. EP 17 91 4637.8.

* cited by examiner

THYRISTOR STARTER

TECHNICAL FIELD

The present invention relates to a thyristor starter.

BACKGROUND ART

Thyristor starters have been developed for staring synchronous machines such as generators and motors (for example, see WO2014/033849 (PTL 1)). A thyristor starter includes a converter for converting AC power into DC power, a DC reactor for smoothing DC power, and an inverter for converting DC power applied from the converter through the DC reactor into AC power with a variable frequency to supply the AC power to a synchronous machine. The AC power supplied to the synchronous machine is controlled whereby the synchronous machine in a stop state can be started and driven at a predetermined rotation speed.

CITATION LIST

Patent Literature

PTL 1: WO2014/033849

SUMMARY OF INVENTION

Technical Problem

In the thyristor starter described above, the inverter has at least six thyristors. The inverter supplies three-phase AC power to the synchronous machine to increase the rotation speed of the synchronous machine, by firing six thyristors two by two in order in synchronization with rotation of the synchronous machine.

However, when a short-circuit failure occurs in any of six thyristors during commutation operation of the inverter, another sound thyristor is fired, whereby a path is formed through which fault current flows through this thyristor. Consequently, components such as sound thyristors and armature windings are damaged by fault current.

The larger the fault current is or as the longer the conducting time of fault current is, the greater the damage on the components is, and the possibility that the components are damaged becomes higher.

The present invention has been made in order to solve the problem above, and an object of the present invention is to provide a thyristor starter capable of suppressing damage by fault current.

Solution to Problem

According to an aspect of the present invention, a thyristor starter for starting a synchronous machine includes a converter, a DC reactor, and an inverter. The converter is configured to convert AC power into DC power. The DC reactor smooths the DC power. The inverter is configured to convert the DC power applied from the converter through the DC reactor into AC power with a variable frequency and supply the AC power to the synchronous machine. The thyristor starter is configured to accelerate the synchronous machine from a stop state to a predetermined rotation speed by sequentially performing a first mode of performing commutation of the inverter by intermittently setting DC output current to zero and a second mode of performing commutation of the inverter by induced voltage of the synchronous machine. In a first case in which a first synchronous machine having a first inductance is started, a switching rotation speed for switching from the first mode to the second mode is set to a higher rotation speed, compared with a second case in which a second synchronous machine having a second inductance larger than the first inductance is started.

Advantageous Effects of Invention

The present invention can provide a thyristor starter capable of suppressing damage by fault current.

DESCRIPTION OF EMBODIMENTS

Embodiments of the present invention will be described in detail below with reference to the drawings. The same or corresponding parts are denoted by the same reference signs and a description thereof will not be repeated.

First Embodiment

Figure 1:
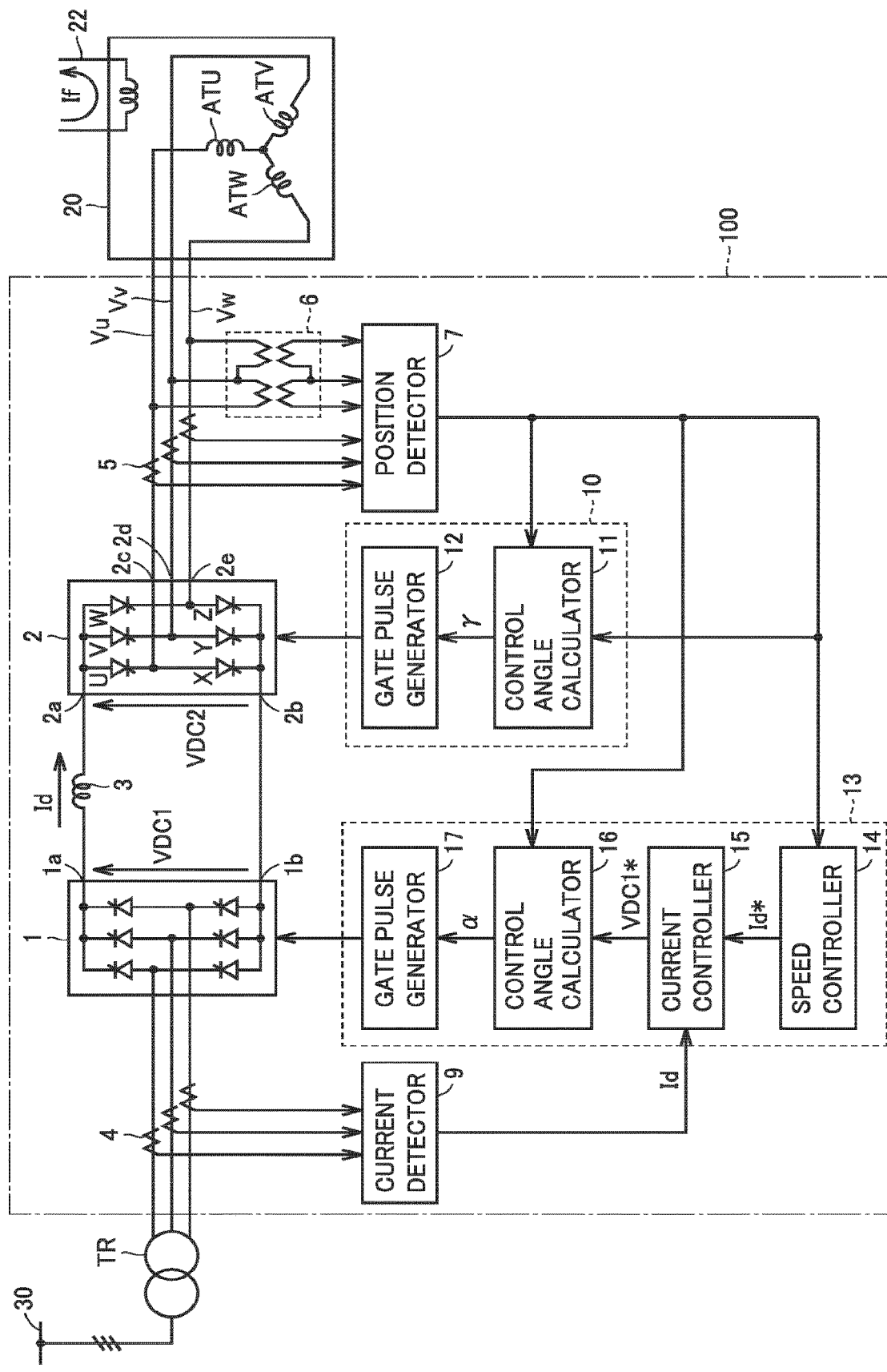
FIG. 1 is a circuit block diagram showing a configuration of a thyristor starter according to a first embodiment of the present invention.

FIG. 1 is a circuit block diagram showing a configuration of a thyristor starter according to a first embodiment of the present invention. Referring to FIG. 1, a thyristor starter 100 according to the first embodiment of the present invention starts a synchronous machine 20 by accelerating the stopped synchronous machine 20 to a predetermined rotation speed.

Synchronous machine 20 includes a stator having armature windings ATU, ATV, and ATW and a rotor having a field winding 22. Synchronous machine 20 is coupled to, for example, a gas turbine of a thermal power plant and is rotatably driven by the gas turbine. In the following description, a predetermined rotation speed may be referred to as "rated rotation speed". For example, when the frequency of an AC power supply 30 is 60 Hz, the rated rotation speed is set to 3600 rpm.

Thyristor starter 100 is connected to the secondary side of a transformer TR. The primary side of transformer TR is connected to AC power supply 30. Transformer TR converts three-phase AC voltage supplied from AC power supply 30 into three-phase AC voltage having a predetermined voltage value and applies the three-phase AC voltage to thyristor starter 100.

Thyristor starter 100 includes a converter 1, a DC reactor 3, and an inverter 2. Converter 1 is a three-phase full-wave rectifier including at least six thyristors and converts three-phase AC power from transformer TR into DC power with a variable voltage.

DC reactor 3 is connected between positive-side output terminal 1a of converter 1 and positive-side input terminal 2a of inverter 2. DC reactor 3 smooths DC output current Id from converter 1. Negative-side output terminal 1b of converter 1 and negative-side input terminal 2b of inverter 2 are connected to each other. Another DC reactor 3 may be connected between negative-side output terminal 1b of converter 1 and negative-side input terminal 2b of inverter 2.

Three output terminals 2c, 2d, and 2e of inverter 2 are connected to three armature windings ATU, ATV, and ATW, respectively, of synchronous machine 20. Inverter 2 is a three-phase external-commutated inverter including at least six thyristors U, V, W, X, Y, and Z.

Thyristor starter 100 further includes current transformers 4 and 5, a voltage detector 6, a position detector 7, a current detector 9, an inverter controller 10, and a converter controller 13.

Current transformer 4 detects three-phase AC current flowing from transformer TR to converter 1 and applies a signal indicating the detected value to current detector 9. Current detector 9 calculates DC current Id output from converter 1, based on a signal from current transformer 4, and applies a signal indicating the calculated value to converter controller 13. Specifically, current detector 9 has a full-wave rectifying diode rectifier and converts the detected three-phase AC current into DC current Id.

Current transformer 5 detects current flowing from inverter 2 to armature windings ATU, ATV, and ATW of synchronous machine 20 and applies a signal indicating the detected value to position detector 7.

Voltage detector 6 detects instantaneous values of three-phase AC voltages Vu, Vv, and Vw supplied to synchronous machine 20 from inverter 2 and applies a signal indicating the detected values to position detector 7. Specifically, voltage detector 6 detects two line voltages of line voltages of three-phase AC voltages in armature windings ATU, ATV, and ATW of synchronous machine 20 (in FIG. 1, AC voltage Vu–v between the U-phase and the V-phase and AC voltage Vv–w between the V-phase and the W-phase). In this way, AC voltages of the U phase, the V phase, and the W phase can be obtained through calculation by detecting at least two line voltages of AC voltage Vu–v between the U phase and the V phase, AC voltage Vv–w between the V phase and the W phase, and AC voltage Vw–u between the W phase and the U phase. This conversion from line voltage to phase voltage is performed in voltage detector 6 or position detector 7.

Position detector 7 detects the position of the rotor of synchronous machine 20 based on signals from current transformer 5 and voltage detector 6 and applies a signal indicating the detected value to inverter controller 10 and converter controller 13.

Inverter controller 10 controls a firing phase of inverter 2 based on a signal from position detector 7. Specifically, inverter controller 10 includes a control angle calculator 11 and a gate pulse generator 12. Control angle calculator 11 calculates a phase control angle (firing angle) γ based on the detected position of the rotor of synchronous machine 20 and applies the calculated phase control angle γ to gate pulse generator 12. Gate pulse generator 12 generates a gate pulse (firing command) to be applied to the gates of the thyristors of inverter 2, based on phase control angle γ received from control angle calculator 11. Inverter controller 10 corresponds to an embodiment of "first controller".

Converter controller 13 controls a firing phase of converter 1, based on a signal from position detector 7 and a signal from current detector 9. Specifically, converter controller 13 controls a firing phase of converter 1 such that DC current Id output from converter 1 matches current command value Id*. Converter controller 13 corresponds to an embodiment of "second controller".

Converter controller 13 includes a speed controller 14, a current controller 15, a control angle calculator 16, and a gate pulse generator 17. Speed controller 14 calculates the rotation speed of synchronous machine 20, based on the detected position of the rotor of synchronous machine 20. Speed controller 14 generates current command value Id*, which is a target value of DC current Id, based on the calculated rotation speed.

Current controller 15 calculates a deviation ΔId between current command value Id* and DC current Id and generates a voltage command value VDC1* based on the calculated deviation ΔId. Specifically, current controller 15 includes a proportional element (P), an integral element (I), and an adder. The proportional element multiplies deviation ΔId by a predetermined proportional gain for output to the adder, and the integral element integrates deviation ΔId by a predetermined integral gain for output to the adder. The adder adds the outputs from the proportional element and the integral element to generate voltage command value VDC1*. Voltage command value VDC1* corresponds to a control command that defines DC voltage VDC1 to be output by converter 1.

Converter 1 performs control such that DC voltage VDC1 is greater than DC voltage VDC2 on the input terminal side of inverter 2 by the amount of voltage drop by DC reactor 3. DC current Id is thus controlled.

Control angle calculator 16 calculates phase control angle α based on voltage command value VDC1* applied from current controller 15. Control angle calculator 16 applies the calculated phase control angle α to gate pulse generator 17.

Gate pulse generator 17 generates a gate pulse (firing command) to be applied to the gates of the thyristors of converter 1, based on phase control angle α received from control angle calculator 16. The switching of converter 1 is controlled in accordance with the gate pulse generated by gate pulse generator 17, whereby DC current Id in accordance with current command value Id* is output from converter 1.

Figure 2:
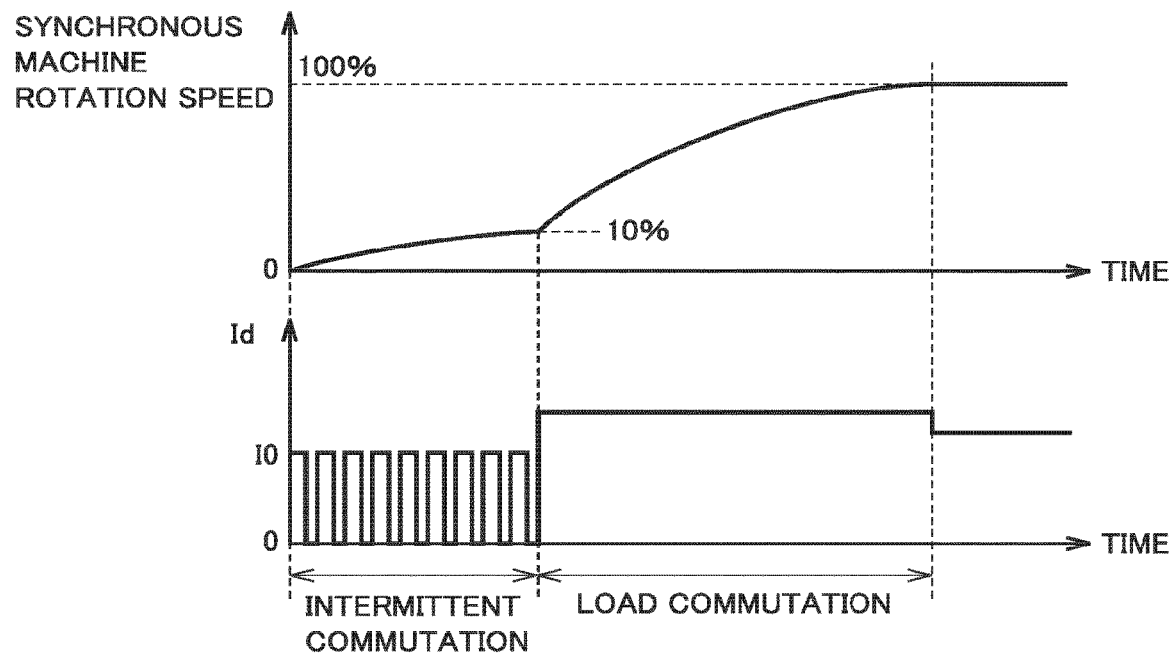
FIG. 2 is a time chart showing the operation of the thyristor starter.

Referring now to FIG. 2, the operation of thyristor starter 100 will be described.

FIG. 2 is a time chart showing the operation of thyristor starter 100. FIG. 2 shows DC current Id output from converter 1 and the rotation speed of synchronous machine 20.

In thyristor starter 100, commutation of the thyristors in inverter 2 is performed using counterelectromotive force (induced voltage) induced in armature windings ATU, ATV, and ATW of synchronous machine 20. Such commutation is called "load commutation".

However, when the rotation speed of synchronous machine 20 is low, that is, at startup or at a low speed of synchronous machine 20, the induced voltage produced in armature windings ATU, ATV, and ATW is low and therefore commutation of the thyristors may fail. For this reason, when the rotation speed of synchronous machine 20 is low, "intermittent commutation" is employed in which commutation of inverter 2 is performed by intermittently setting DC output current Id of converter 1 to zero.

As shown in FIG. 2, thyristor starter 100 sequentially switches and performs the intermittent commutation mode (first mode) and the load commutation mode (second mode) so that synchronous machine 20 is accelerated from a stop state to the rated rotation speed.

Specifically, at time t=0, synchronous machine 20 in a stop state is started, and then thyristor starter 100 performs the intermittent commutation mode. In the intermittent commutation mode, DC current Id exhibits a pulse waveform. The peak value of each pulse is usually set to a constant value (Id=I0). The peak value is set, for example, such that the integrated value of AC power supplied to synchronous machine 20 during the intermittent commutation mode satisfies the amount of electric power for accelerating synchronous machine 20 in a stop state to the switching rotation speed.

Then, when the rotation speed of synchronous machine 20 reaches about 10% of the rated rotation speed, thyristor starter 100 switches from the intermittent commutation mode to the load commutation mode. In the following description, the rotation speed at which the intermittent commutation mode switches to the load commutation mode may be referred to as "switching rotation speed". In the example in FIG. 2, the switching rotation speed is about 10% of the rated rotation speed.

Figure 3:
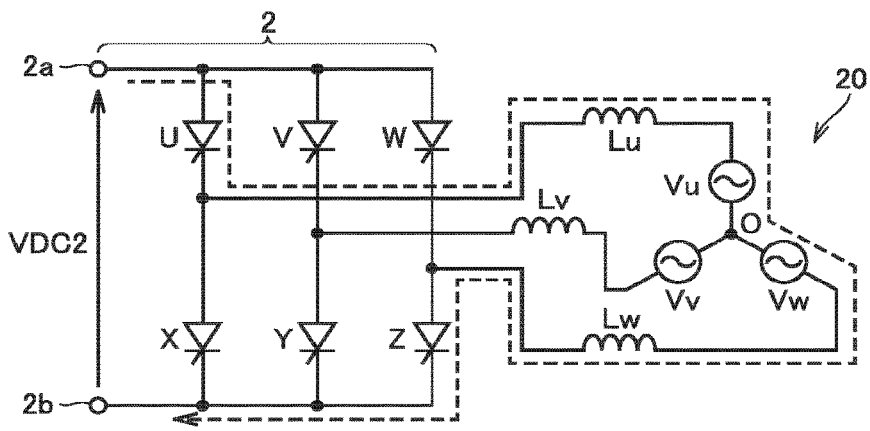
FIG. 3 is a circuit block diagram showing the configuration and operation of the inverter shown in FIG. 1.

FIG. 3 is a circuit block diagram showing the configuration and the operation of inverter 2 shown in FIG. 1. Referring to FIG. 3, thyristors U, V, and W have anodes connected together to positive-side input terminal 2a and cathodes connected to output terminals 2c, 2d, and 2e, respectively. Thyristors X, Y, and Z have anodes connected to output terminals 2c, 2d, 2e, respectively, and cathodes connected together to negative-side input terminal 2b.

One of thyristors U, V, and W and one of thyristors X, Y, and Z are conducting in synchronous with three-phase AC voltages Vu, Vv, and Vw, whereby inverter 2 converts DC power supplied from converter 1 through DC reactor 3 into three-phase AC power with a variable frequency and a variable voltage AC power and applies the converted AC power to the stator (armature windings ATU, ATV, and ATW) of synchronous machine 20. This can increase the rotation speed of synchronous machine 20.

For example, as shown in FIG. 3, when thyristors U and Z are conducting, U-phase voltage Vu of synchronous machine 20 appears at input terminal 2a of inverter 2 through inductance Lu and thyristor U, and W-phase voltage Vw appears at input terminal 2b of inverter 2 through inductance Lw and thyristor Z. That is, AC voltage Vw–u between the W-phase and the U-phase of synchronous machine 20 appears as DC voltage VDC2 between input terminals 2a and 2b. Reactors Lu, Lv, and Lw represent inductances of armature windings ATU, ATV, and ATW, respectively, of synchronous machine 20.

Figure 4:
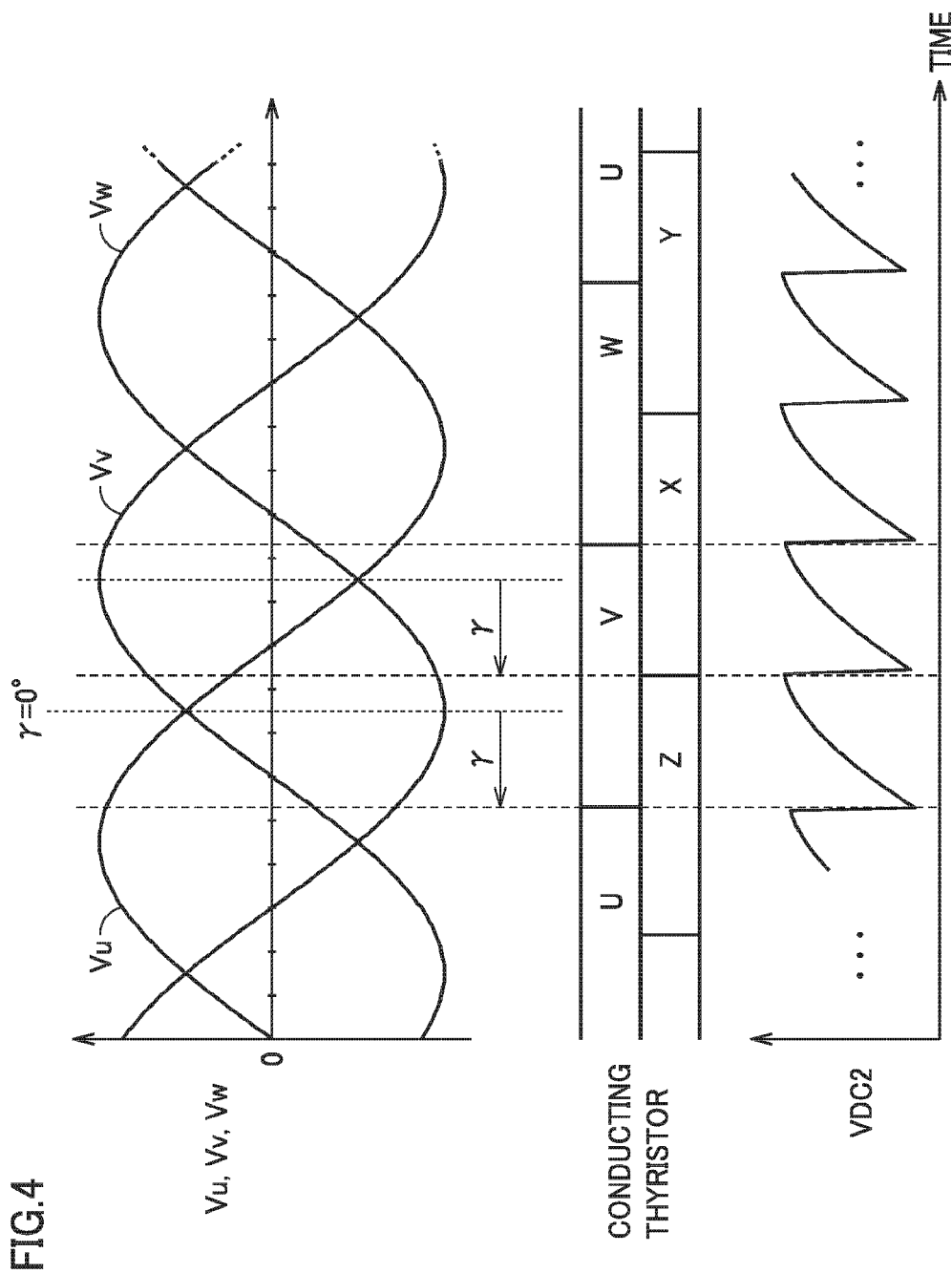
FIG. 4 is a time chart schematically showing an ideal commutating operation of the inverter in a load commutation mode.

FIG. 4 is a time chart schematically showing an ideal commutating operation of inverter 2 in the load commutation mode. FIG. 4 shows three-phase AC voltages Vu, Vv, and Vw, conducting thyristors of six thyristors U, V, W, X, Y, and Z of inverter 2, and DC voltage VDC2 appearing between input terminals 2a and 2b of inverter 2.

In FIG. 4, the point at which line voltages Vu–v, Vv–w, and Vw–u are 0 V is the reference point of phase control angle γ, and at the reference point, γ=0°. In the load commutation mode, a gate pulse is applied to the thyristors at a time ahead in phase by a predetermined angle γ from the reference point. For example, a gate pulse is applied to thyristor V during a period in which thyristor U is conducting, and then a gate pulse is applied to thyristor W during a period in which thyristor V is conducting. Similarly, a gate pulse is applied to thyristor X during a period in which thyristor Z is conducting, and then a gate pulse is applied to thyristor Y during a period in which thyristor X is conducting.

In response to transition of the conducting thyristor, line voltages Vu–v, Vv–w, and Vw–u of synchronous machine 20 sequentially appear as DC voltage VDC2 between input terminals 2a and 2b of inverter 2. Inverter controller 10 fires six thyristors U, V, W, X, Y, and Z two by two in order in response to rotation of synchronous machine 20 to control the path of current flowing through synchronous machine 20.

Here, we discuss a case where a short-circuit failure occurs, in which the anode and the cathode are electrically short-circuited in any one of six thyristors U, V, W, X, Y, and Z of inverter 2 in the load commutation mode.

Figure 5:
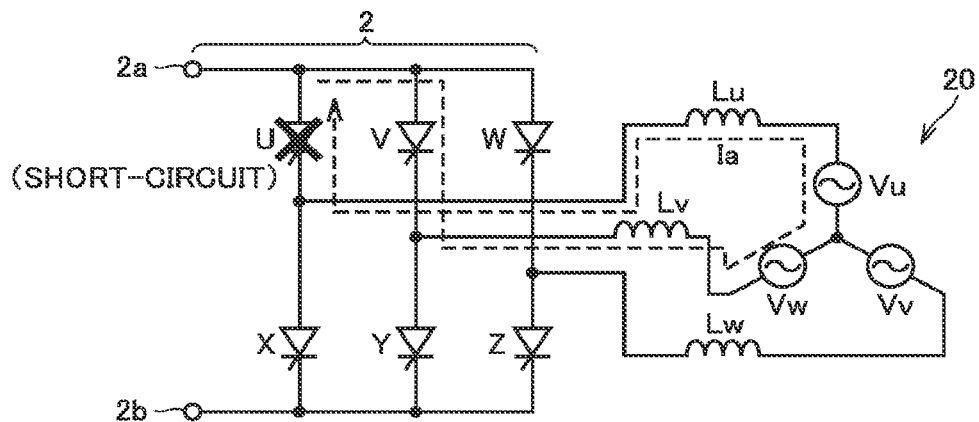
FIG. 5 is a circuit diagram for explaining a path of fault current.

For example, in a case where a short-circuit failure occurs in thyristor U, when a gate pulse is applied to thyristor V to make thyristor V conducting, a path of fault current Ia is formed so as to include thyristors V and U as shown in FIG. 5. Then, sound thyristor V and components such as armature windings may be damaged by fault current Ia. The larger fault current Ia is, or the longer the conducting time of fault current Ia is, the greater the damage on the components is, and it is more likely that the components are damaged.

Figure 6:
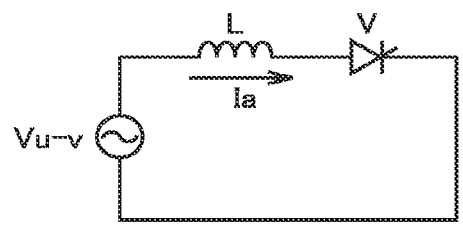
FIG. 6 is a circuit diagram schematically illustrating the path of fault current shown in FIG. 5.

The path of fault current Ia shown in FIG. 5 can be represented by an equivalent circuit diagram as shown in FIG. 6. In the equivalent circuit diagram in FIG. 6, the inductance of reactor L corresponds to the total value of inductances of armature windings ATU and ATV. AC power supply voltage corresponds to line voltage Vu-v of synchronous machine 20. It is assumed that the resistance component of each armature winding is negligibly small.

When thyristor V is conducting, fault current Ia flows in thyristor V through reactor L. When the effective value of line voltage Vu–V is V, line voltage Vu–v is written as Equation (1) below.

$$Vu-v = \sqrt{2}V \sin\theta \qquad (1)$$

Fault current Ia is current lagging behind line voltage Vu–v by 90° in phase. In the case of γ=π/2, fault current Ia is given by Equation (2) below, where L is the inductance of reactor L, and ω is the rotational angular velocity of synchronous machine 20.

$$Ia = \frac{\sqrt{2}\,V}{\omega L}\sin\theta \tag{2}$$

Figure 7:
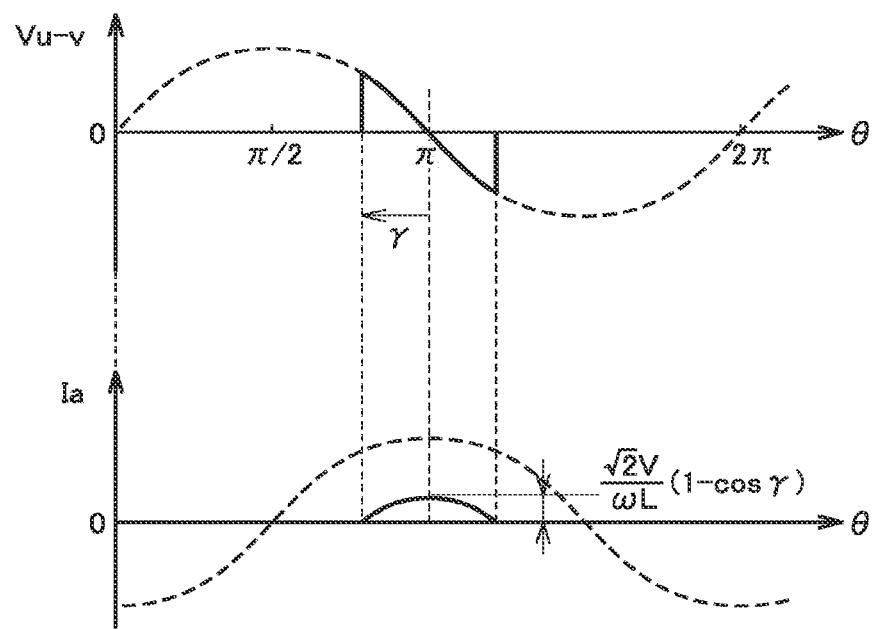
FIG. 7 is a diagram showing operation waveforms of line voltage and fault current.

FIG. 7 is an operation waveform of line voltage Vu–v and fault current Ia when π/2≤γ<π. The current waveform shown by a broken line in FIG. 7 indicates fault current Ia when γ=π/2.

Fault current Ia is a symmetrical waveform with respect to θ=π. The circuit equation in the thyristor V conducting period γ≤θ≤π+γ is given by Equation (3) below.

$$Vu - v = \sqrt{2}\,V\sin\theta = L\frac{dIa}{dt} \tag{3}$$

Solving Equation (3) with θ=ωt=π−γ and given a condition Ia=0 results in Equation (4) below. This current waveform is the same as the one obtained by removing the portion of it π−γ≤θ≤π+γ from the current waveform of γ=π/2.

$$Ia = \frac{\sqrt{2}\,V}{\omega L}(\cos\theta + \cos\gamma) \tag{4}$$

Ia is largest when θ=π, and the maximum value is obtained by Equation (5) below.

$$Ia = \frac{\sqrt{2}\,V}{\omega L}(1 + \cos\gamma) \tag{5}$$

According to Equation (5), when the rotation speed (rotational angular velocity ω) of synchronous machine 20 and the phase control angle γ are constant, fault current Ia is larger as the inductance of reactor L is smaller. This indicates that fault current Ia is larger in synchronous machine 20 with a small inductance, compared with synchronous machine 20 with a large inductance. In the following description, synchronous machine 20 having a first inductance is referred to as "first synchronous machine", and synchronous machine 20 having a second inductance larger than the first inductance may be referred to as "second synchronous machine".

The conducting time of fault current Ia is represented by the rotation period of synchronous machine 20×2γ/2π. Therefore, the conducting time is inversely proportional to the rotation speed of synchronous machine 20. This indicates that the lower the rotation speed of synchronous machine 20 is, the longer the conducting time of fault current Ia is.

In this way, if a short-circuit failure occurs in any one of six thyristors U, V, W, X, Y, and Z of inverter 2 during the load commutation mode, fault current Ia flows through components of thyristor starter 100 and synchronous machine 20. The magnitude of fault current Ia is larger as the inductance of synchronous machine 20 is smaller. The conducting time of fault current Ia is longer as the rotation speed of synchronous machine 20 is lower.

According to the time chart in FIG. 2, the timing when the rotation speed of synchronous machine 20 is lowest in the load commutation mode is the timing at which the intermittent commutation mode switches to the load commutation mode. Thus, if a short-circuit failure occurs at this timing, the conducting time of fault current Ia is longest, leading to great damage to the components.

In the first synchronous machine, in particular, fault current Ia is larger because of a smaller inductance, compared with the second synchronous machine, and it is anticipated that the damage is greater.

Then, thyristor starter 100 according to the first embodiment is configured such that the switching rotation speed can be changed in accordance with the inductance of the target synchronous machine 20. Specifically, when the first synchronous machine is started (first case), the switching rotation speed is set to a higher rotation speed compared with when the second synchronous machine is started (second case).

Figure 8:
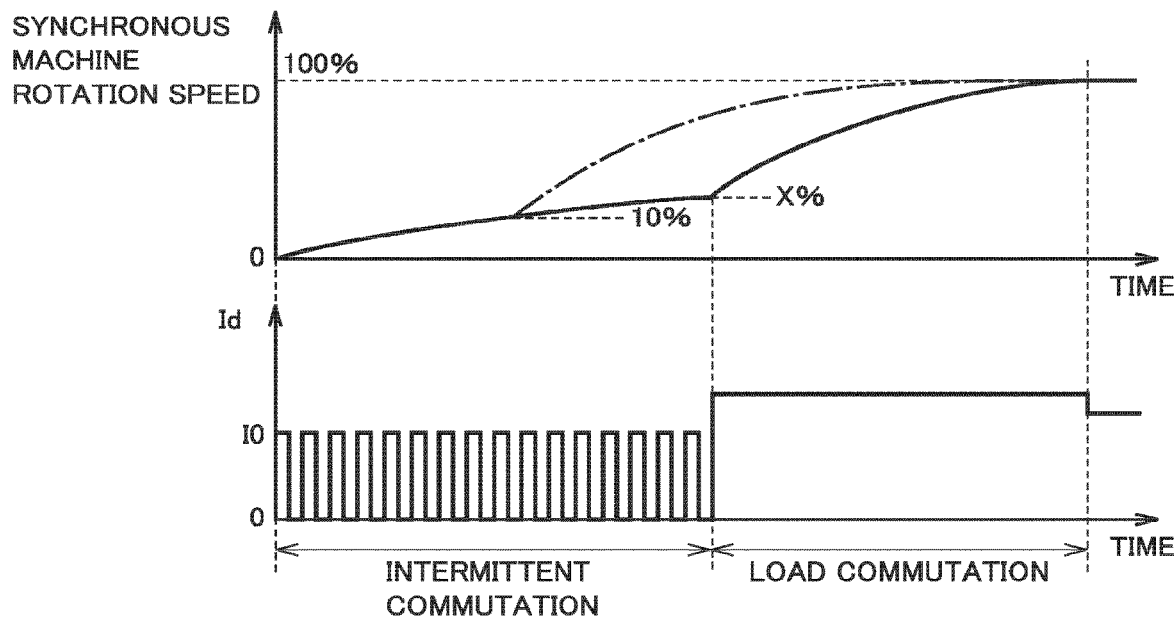
FIG. 8 is a time chart schematically showing the relation between the rotation speed of the synchronous machine and DC current output from a converter when the switching rotation speed is X % of the rated rotation speed.

The operation effect of increasing the switching rotation speed in a synchronous machine will be described with reference to FIG. 8. FIG. 8 is a time chart schematically showing the relation between the rotation speed of synchronous machine 20 and DC current Id output from converter 1 when the switching rotation speed is X % of the rated rotation speed (where X>10), in comparison with FIG. 2. In FIG. 8, the rotation speed of synchronous machine 20 shown in FIG. 2 is shown by a dot and dashed line. DC current Id in each of the intermittent commutation mode and the load commutation mode is equal between FIG. 2 and FIG. 8.

As shown in FIG. 8, when the switching rotation speed is X % of the rated rotation speed, the rotation speed of synchronous machine 20 at the timing when the intermittent commutation mode switches to the load commutation mode is higher, compared with when the switching rotation speed is 10% of the rated rotation speed. Therefore, if a short-circuit failure occurs at this timing, the conducting time of fault current Ia is shorter. Damage given by fault current Ia on the components thus can be reduced.

As described above, when the first synchronous machine is started, fault current Ia is larger compared with when the second synchronous machine is started, and therefore the operation effect achieved by increasing the switching rotation speed as described above is remarkable. As a result, thyristor starter 100 can suppress damage on the components by fault current, irrespective of inductance of the target synchronous machine.

Figure 9:
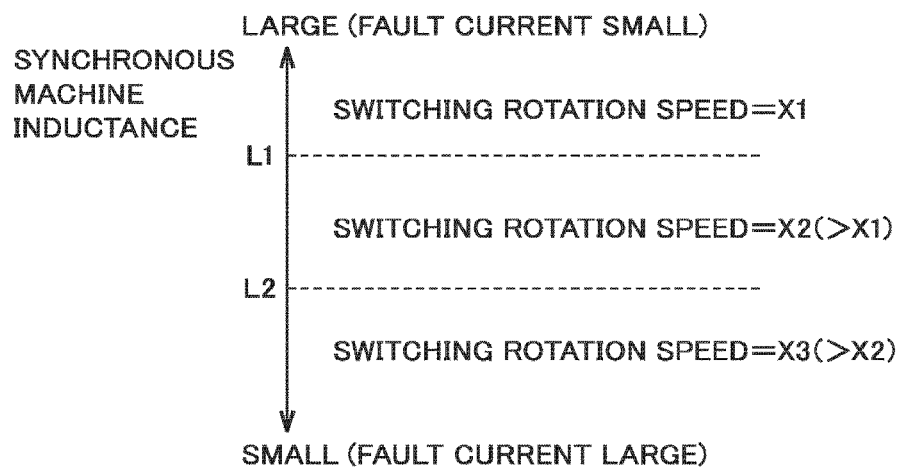
FIG. 9 is a diagram schematically showing an example of the relation between inductance of the synchronous machine started by the thyristor starter and the switching rotation speed.

FIG. 9 is a diagram schematically showing an example of the relation between inductance of synchronous machine 20 started by thyristor starter 100 and the switching rotation speed.

As shown in FIG. 9, when the inductance of synchronous machine 20 is equal to or larger than L1, the switching rotation speed is set to X1% of the rated rotation speed. By contrast, when inductance of synchronous machine 20 is equal to or larger than L2 and less than L1, the switching rotation speed is set to X2% (X2>X1) of the rated rotation speed. When inductance of synchronous machine 20 is equal to or less than L2, the switching rotation speed is set to X3% (X3>X2) of the rated rotation speed. This can suppress damage to the components even when a short-circuit failure occurs in inverter 2 in the case where thyristor starter 100 starts synchronous machine 20 with a small inductance.

The user of thyristor starter 100 can set the switching rotation speed based on inductance of target synchronous machine 20 by referring to the relation shown in FIG. 9. The switching rotation speed set by the user can be stored in an internal memory of thyristor starter 100. Inverter controller 10 and converter controller 13 control the firing phases of inverter 2 and converter 1, respectively, in accordance with the switching rotation speed stored in the memory. Thus, when the rotation speed of synchronous machine 20 reaches the set switching rotation speed, thyristor starter 100 switches from the intermittent commutation mode to the load commutation mode.

As described above, in the thyristor starter according to the first embodiment of the present invention, when a synchronous machine having a first inductance (first synchronous machine) is started, the switching rotation speed is increased, whereby the conducting time of fault current can be reduced, compared with when a synchronous machine having a second inductance larger than the first inductance (second synchronous machine) is started. This can suppress damage to the components of the thyristor starter and the synchronous machine by fault current even when a target synchronous machine with a small inductance is started.

Second Embodiment

In thyristor starter 100 according to the forgoing first embodiment, when the first synchronous machine is started, the switching rotation speed is higher and therefore the time spent for the intermittent commutation mode is longer, compared with when the second synchronous machine is started. The speed-up rate of synchronous machine 20 (the rate by which the rotation speed increases) is thus reduced, and consequently, it may take time to start synchronous machine 20.

Then, in thyristor starter 100 according to a second embodiment, when the first synchronous machine is started, current command value Id* in the intermittent commutation mode is set to a higher current value, compared with when the second synchronous machine is started.

Figure 10:
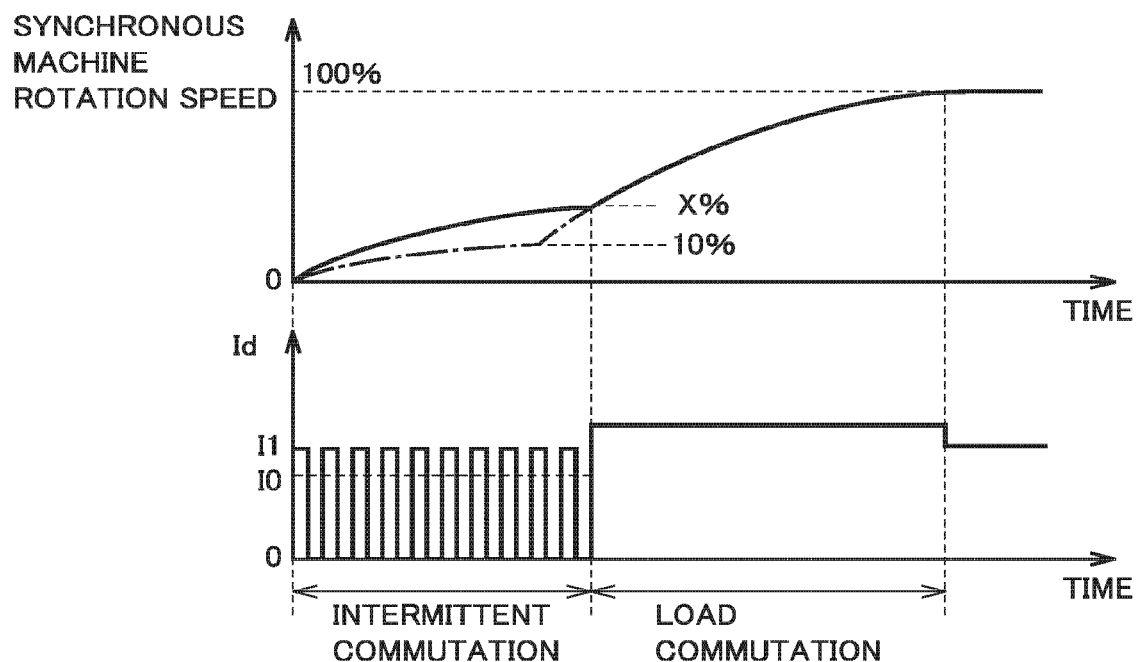
FIG. 10 is a time chart schematically showing the relation between the rotation speed of the synchronous machine and DC current output from the converter.

FIG. 10 is a time chart schematically showing the relation between the rotation speed of synchronous machine 20 and DC current Id output from converter 1, in comparison with FIG. 2. In FIG. 10, the rotation speed of synchronous machine 20 and DC current Id shown in FIG. 2 are shown by dot and dashed lines.

As shown in FIG. 10, in the period of time until synchronous machine 20 reaches the switching rotation speed (X % of the rated rotation speed) from the stop state, the maximum value (that is, the peak value of pulse) of DC current Id output from converter 1 is I1. Since setting I1 larger than I0 increases the speed-up rate, the time taken for synchronous machine 20 to be accelerated to the switching rotation speed can be reduced compared with when DC current Id is I0. Adjusting the magnitude of I1 can equalize the time spent for the intermittent commutation mode between FIG. 2 and FIG. 10.

Figure 11:
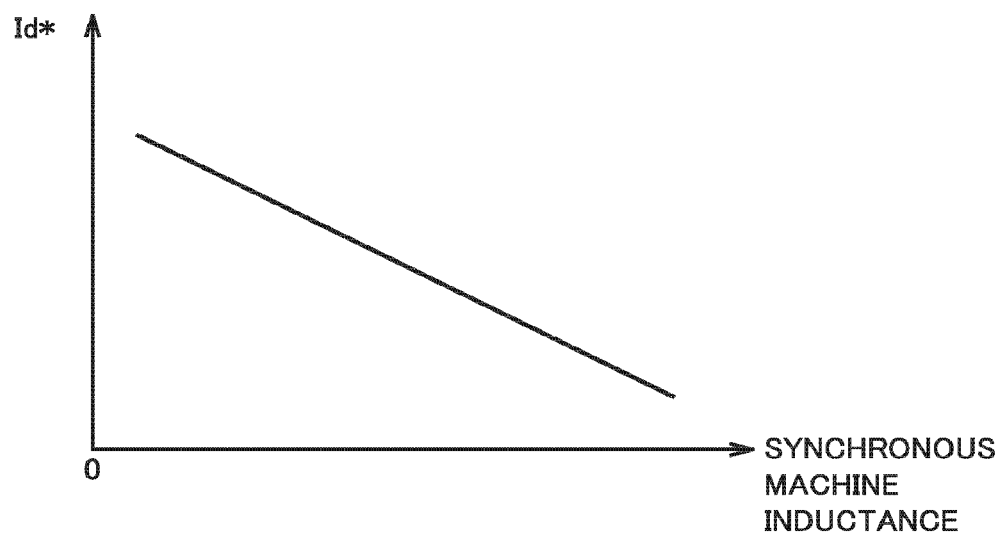
FIG. 11 is a diagram showing an example of the relation between the rotation speed of the synchronous machine and a current command value in the intermittent commutation mode.

The adjustment of DC current Id shown in FIG. 10 can be performed by adjusting current command value Id*. FIG. 11 is a diagram showing an example of the relation between the rotation speed of synchronous machine 20 and current command value Id* in the intermittent commutation mode.

In FIG. 11, current command value Id* is set such that the current value is higher as the inductance of synchronous machine 20 is smaller. Since the switching rotation speed is higher as the inductance of synchronous machine 20 is smaller (see FIG. 9), the prolonged time spent for the intermittent commutation mode can be prevented by increasing current command value Id* in accordance with the relation in FIG. 11.

Data showing the relation shown in FIG. 11 can be stored in an internal memory of thyristor starter 100. Converter controller 13 can refer to the data to generate current command value Id* based on the externally applied inductance of synchronous machine 20. The data may be in the form of a table or a function.

As described above, the thyristor starter according to the second embodiment of the present invention can achieve the similar operation effect as in the first embodiment and, in addition, can start synchronous machine 20 in a short time.

Third Embodiment

When armature windings ATU, ATV, and ATW of synchronous machine 20 are energized by thyristor starter 100, heat loss (Joule heat) occurs in armature windings ATU, ATV, and ATW. The heat loss is proportional to the square of the magnitude of current. Synchronous machine 20 may be provided with a cooling structure in order to prevent synchronous machine 20 from overheating by heat loss.

Figure 12:
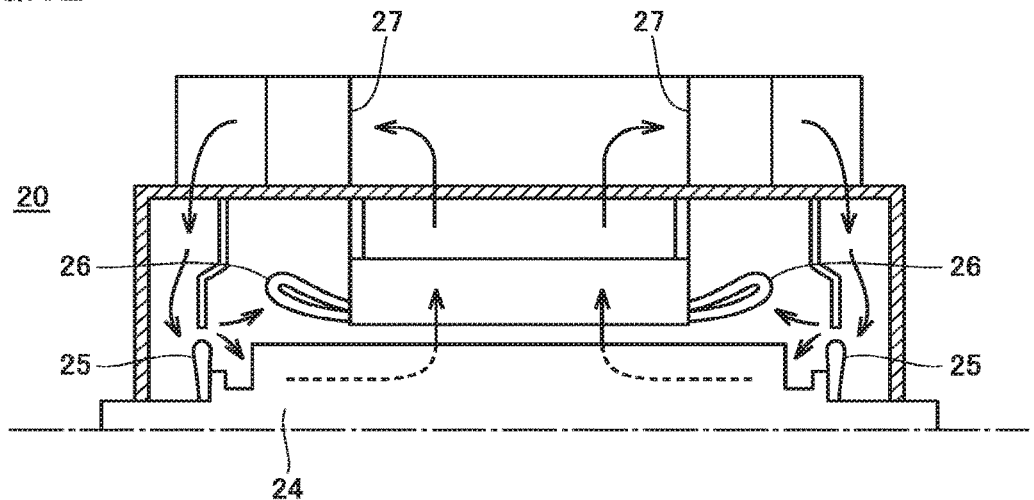
FIG. 12 is a cross-sectional view showing an example of a cooling structure of the synchronous machine.

FIG. 12 is a cross-sectional view showing an example of the cooling structure of synchronous machine 20. Referring to FIG. 12, a fan 25 is attached to the rotation shaft of a rotor 24 inside synchronous machine 20. Fan 25 is rotatably driven by the rotation of rotor 24. When fan 25 rotates, as shown by the arrows in the figure, a cooling medium circulates through a passage formed in rotor 24 and a stator 26. For example, hydrogen gas or air is used as the cooling medium. A cooler 27 is installed in the stator frame to face the passage. The cooling medium circulating through the passage is cooled by cooler 27, cooler 27 installed in the stator frame to face the passage.

In this way, fan 25 is rotated using the rotational force of rotor 24, and therefore when the rotation speed of synchronous machine 20 is low, the rotation speed of fan 25 is also low. It is therefore difficult to circulate the cooling medium through the passage and consequently the cooling capacity of the cooling medium is reduced. Therefore, if DC current Id in the intermittent commutation mode is increased as in the foregoing second embodiment, synchronous machine 20 may overheat.

Increasing the cooling capacity of the cooling medium to suppress overheating of synchronous machine 20 inevitably requires a larger capacity of the cooler and may lead increase in device size.

Then, in thyristor starter 100 according to the third embodiment, the magnitude of DC current Id is changed in accordance with the rotation speed of synchronous machine 20 in the intermittent commutation mode. Specifically, in the intermittent commutation mode, DC current Id is increased as the rotation speed of synchronous machine 20 is higher.

Figure 13:
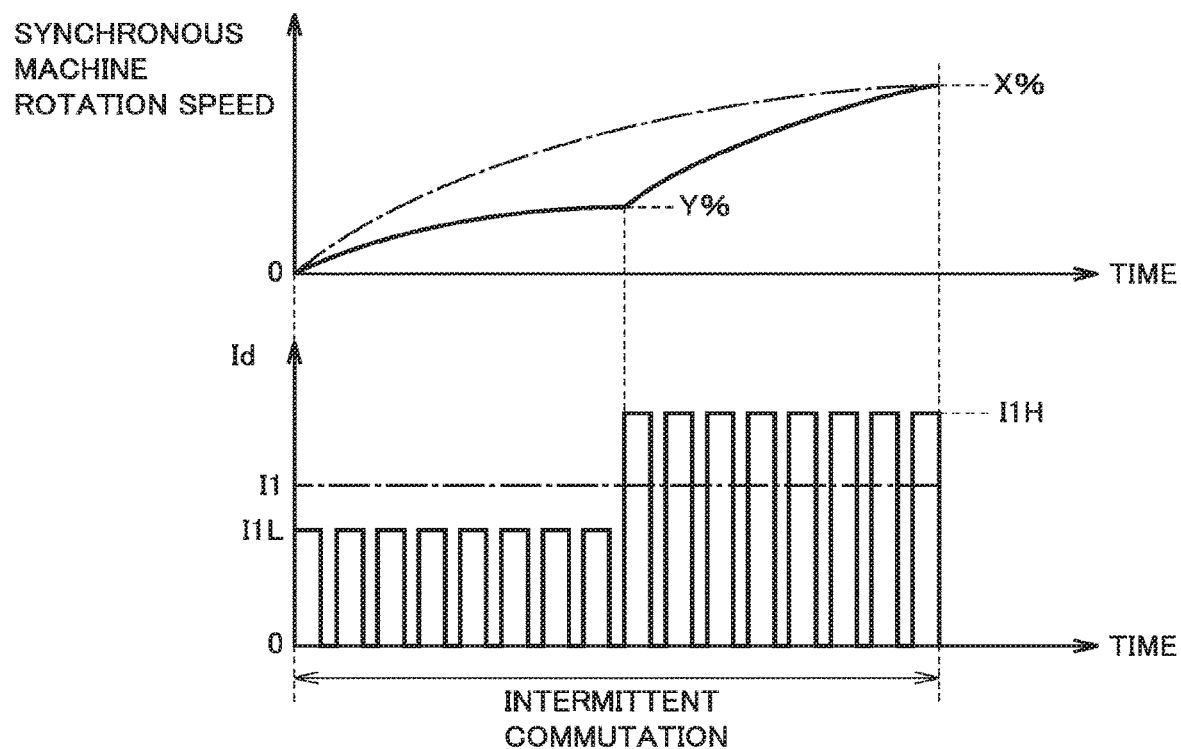
FIG. 13 is a time chart schematically showing the relation between the rotation speed of the synchronous machine and DC current output from the converter in the intermittent commutation mode.

FIG. 13 is a time chart schematically showing the relation between the rotation speed of synchronous machine 20 and DC current Id output from converter 1 in the intermittent commutation mode.

As shown in FIG. 13, in the period of time until synchronous machine 20 reaches Y % of the rated rotation speed (where Y<X) from the stop state, the maximum value (that is, the peak value of pulse) of DC current Id output from converter 1 is I1L. In the period of time until synchronous machine 20 reaches X % (switching rotation speed) from Y % of the rated rotation speed, the maximum value (the peak value of pulse) of DC current Id output from converter 1 is I1H (I1H>I1L).

Y % of the rated rotation speed can be set, for example, based on the lower limit rotation speed of fan 25 (see FIG. 12) at which the cooling medium can be circulated through the passage. With this, in the rotation speed range (0 to Y % of the rated rotation speed) that causes reduction in cooling capacity of the cooling medium, current supplied to synchronous machine 20 has a lower current value and therefore heat loss (Joule heat) of synchronous machine 20 is suppressed. As a result, overheating of synchronous machine 20 can be suppressed.

On the other hand, when the rotation speed of synchronous machine 20 is higher than the above rotation speed range, that is, when the cooling capacity of the cooling medium is ensured, current supplied to synchronous machine 20 is increased. This can increase the speed-up rate of synchronous machine 20 and thus can prevent prolonged time spent for the intermittent commutation mode.

In FIG. 13, the rotation speed of synchronous machine 20 and DC current Id shown in FIG. 10 are shown by dot and dashed lines. The relation I1L<I1<I1H holds among I1L, I1H, and I1. Since setting I1H larger than I1 increases the speed-up rate, the time taken for synchronous machine 20 to be accelerated from Y % to X % of the rated rotation speed can be reduced, compared with when Id is I1. Adjusting the magnitude of I1H can equalize the time spent for the intermittent commutation mode between FIG. 10 and FIG. 13.

The adjustment of DC current Id shown in FIG. 13 can be performed by adjusting current command value Id* in accordance with the rotation speed of synchronous machine 20. That is, in the intermittent commutation mode, current command value Id* is set such that the current value is larger as the rotation speed of synchronous machine 20 is higher.

According to this, current command value Id* changes in accordance with the rotation speed of synchronous machine 20. As used in the present disclosure, "change in accordance with the rotation speed of synchronous machine 20" means that current command value Id* discretely changes in accordance with the rotation speed of synchronous machine 20 or that current command value Id* continuously changes in accordance with the rotation speed of synchronous machine 20.

Figure 14:
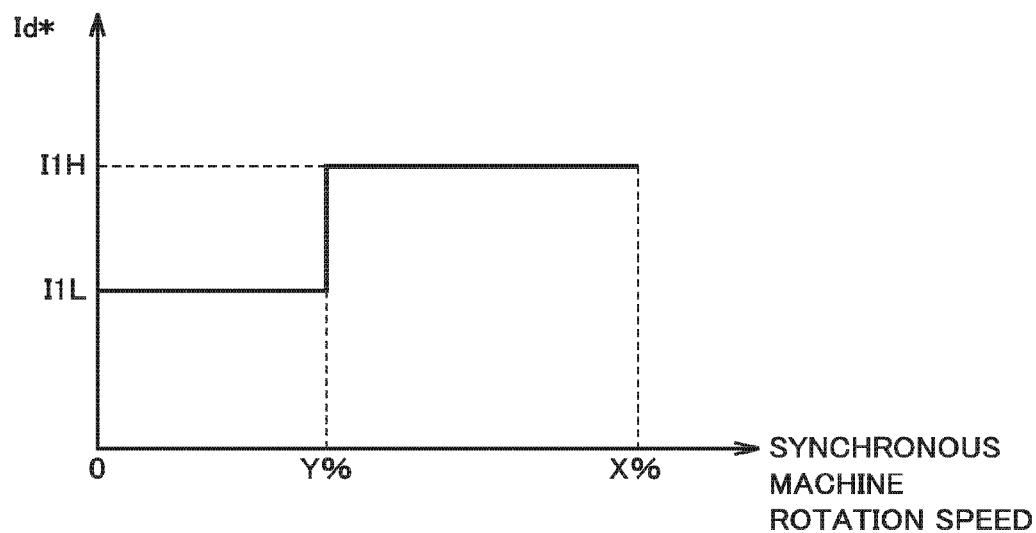
FIG. 14 is a diagram showing an example of the relation between the rotation speed of the synchronous machine and a current command value in the intermittent commutation mode.

FIG. 14 is a diagram showing the relation between the rotation speed of synchronous machine 20 and current command value Id* in the intermittent commutation mode. As shown in FIG. 14, when the rotation speed of the synchronous machine is equal to or higher than 0 rpm and equal to or lower than Y % of the rated rotation speed, current command value Id* is set to it I1L. On the other hand, when the rotation speed of synchronous machine 20 is higher than Y % of the rated rotation speed and equal to or lower than X %, current command value Id* is set to I1H.

Data showing the relation shown in FIG. 14 can be stored in an internal memory of thyristor starter 100. Converter controller 13 can refer to the data to generate current command value Id* based on the calculated rotation speed of synchronous machine 20. The data may be in the form of a table or a function.

As described above, the thyristor starter according to the third embodiment of the present invention can achieve the operation effects below in addition to the similar operation effects as in the first embodiment. Even when a structure of cooling synchronous machine 20 using the rotational force of synchronous machine 20 is employed, synchronous machine 20 can be started in a short time while overheating of synchronous machine 20 is suppressed. In addition, increase in size of the cooling structure for suppressing overheating of synchronous machine 20 can be suppressed.

In the foregoing third embodiment, a configuration in which current command value Id* is changed in two steps in the intermittent commutation mode (see FIG. 14) has been illustrated. However, current command value Id* may be changed in three or more steps.

Figure 15:
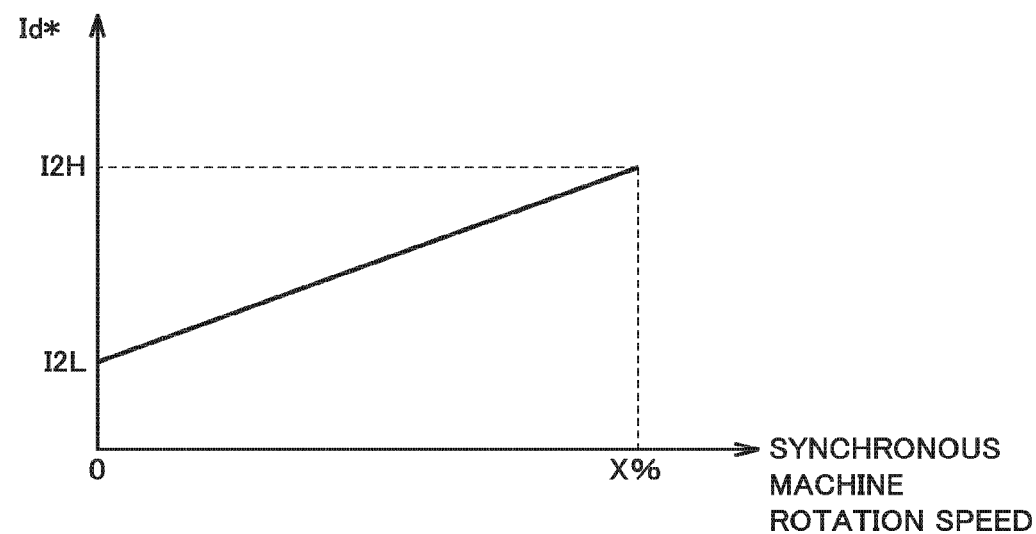
FIG. 15 is a diagram showing another example of the relation between the rotation speed of the synchronous machine and a current command value in the intermittent commutation mode.

Alternatively, as shown in FIG. 15, during the intermittent commutation mode, current command value Id* may be continuously changed in accordance with the rotation speed of synchronous machine 20. In the example in FIG. 15, current command value Id* is I2L when the rotation speed of synchronous machine 20 is 0 rpm and is I2H (I2H>I2L) when the rotation speed of synchronous machine 20 is 10% of the rated rotation speed (that is, switching rotation speed). Current command value Id* changes linearly in accordance with the rotation speed.

Figure 16:
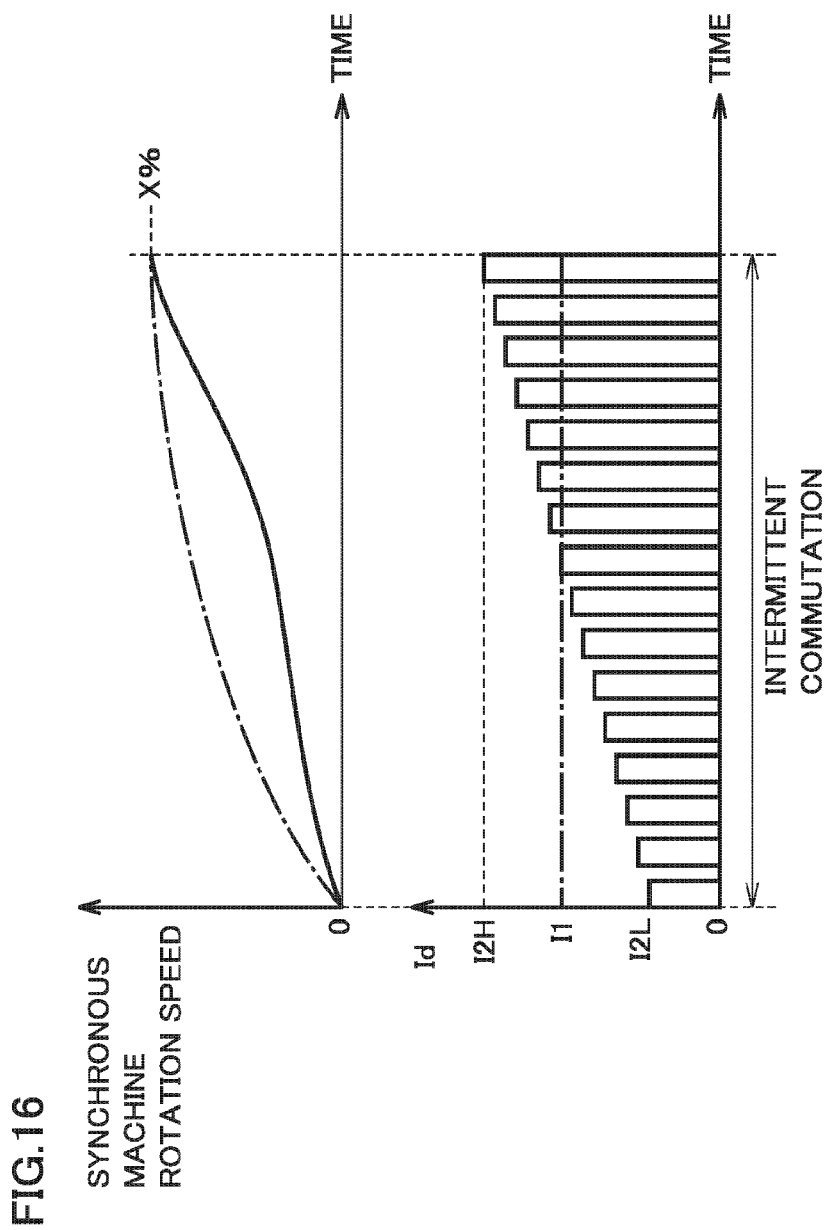
FIG. 16 is a time chart schematically showing the relation between the rotation speed of the synchronous machine and DC current output from the converter in the intermittent commutation mode.

FIG. 16 is a time chart schematically showing the relation between the rotation speed of synchronous machine 20 and DC current Id output from converter 1 when the intermittent commutation mode is performed in accordance with the relation shown in FIG. 15.

As shown in FIG. 16, in the period of time until synchronous machine 20 reaches the switching rotation speed from the stop state, DC current Id continuously changes. In FIG. 16, the rotation speed of synchronous machine 20 and DC current Id shown in FIG. 10 are shown by dot and dashed lines. The relation I2L<I1<I2H holds among I2L, I2H, and I1. Adjusting the magnitude of I2H can equalize the time spent for the intermittent commutation mode between FIG. 10 and FIG. 16.

In the foregoing first to third embodiments, synchronous machine 20 is a generator rotatably driven by a gas turbine in a thermal power plan. However, the embodiment is not limited thereto and synchronous machine 20 may be a synchronous machine for use in general industrial fields. For example, synchronous machine 20 may be a synchronous machine for a cooling blower in a steel plant.

The embodiments disclosed herein are illustrative and not limited to the description above. The scope of the present invention is defined by the claims, and it is intended that all modifications that come within meaning and range of equivalency of the claims are embraced.

REFERENCE SIGNS LIST

1 converter, 2 inverter, 3 DC reactor, 4, 5 current transformer, 6 voltage detector, 7 position detector, 9 current detector, 10 inverter controller, 11, 16 control angle calculator, 12, 17 gate pulse generator, 14 speed controller, 15 current controller, 20 synchronous machine, 22 field winding, 24 rotor, 25 fan, 26 stator, 27 cooler, 30 AC power supply, 100 thyristor starter, ATU, ATV, ATW armature winding, U, V, W, X, Y, Z thyristor, TR transformer.

The invention claimed is:

1. A thyristor starter for starting a synchronous machine, comprising:
   a converter that converts AC power into DC power;
   a DC reactor that smooths the DC power; and
   an inverter that converts the DC power applied from the converter through the DC reactor into AC power with a variable frequency and supplies the AC power to the synchronous machine, wherein
   the thyristor starter accelerates the synchronous machine from a stop state to a predetermined rotation speed by sequentially performing a first mode and a second mode, the first mode performing commutation of the inverter by intermittently setting DC output current of the converter to zero, the second mode performing commutation of the inverter by induced voltage of the synchronous machine, the thyristor starter switching the first mode to the second mode when a rotation speed, of the synchronous machine reaches at a switching rotation speed, in a first case in which the synchronous machine acts as a first synchronous machine having a first inductance, the switching rotation speed for switching from the first mode to the second mode is set to a first rotation speed, and in a second case in which the synchronous machine acts as a second synchronous machine having a second inductance larger than the first inductance, the switching rotation speed is set to a second rotation speed lower than the first rotation speed.

2. The thyristor starter according to claim 1, further comprising:
- a position detector that detects a rotor position of the synchronous machine;
- a first controller that controls a firing phase of a thyristor in the inverter, based on a detection signal of the position detector; and
- a second controller that controls a firing phase of a thyristor in the converter such that the DC output current matches a current command value, based on a detection signal of the position detector, wherein in the first case, the current command value in the first mode is set to a higher current value, compared with the second case.

3. The thyristor starter according to claim 2, wherein in the first mode, the current command value is set such that a current value is larger as rotation speed of the synchronous machine is higher.

4. The thyristor starter according to claim 3, wherein in the first mode, the current command value discretely changes in accordance with rotation speed of the synchronous machine.

5. The thyristor starter according to claim 3, wherein in the first mode, the current command value continuously changes in accordance with rotation speed of the synchronous machine.

6. The thyristor starter according to claim 3, wherein the synchronous machine includes
- a stator receiving supply of AC power from the inverter,
- a rotor, and
- a fan attached to a rotation shaft of the rotor, the fan circulating a cooling medium through a passage formed in the stator and the rotor.

* * * * *